(12) United States Patent
Snapir et al.

(10) Patent No.: US 10,909,192 B2
(45) Date of Patent: Feb. 2, 2021

(54) PROVIDING INFORMATION TECHNOLOGY SUPPORT

(71) Applicant: Hewlett Packard Enterprise Development LP, Houston, TX (US)

(72) Inventors: Yariv Snapir, Yehud (IL); Gad Sakin, Yehud (IL); Leonid Reznik, Yehud (IL); David Baron, San Diego, CA (US); Michael Dikman, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 616 days.

(21) Appl. No.: 15/033,107

(22) PCT Filed: Oct. 29, 2013

(86) PCT No.: PCT/US2013/067202
§ 371 (c)(1),
(2) Date: Apr. 28, 2016

(87) PCT Pub. No.: WO2015/065327
PCT Pub. Date: May 7, 2015

(65) Prior Publication Data
US 2016/0253426 A1    Sep. 1, 2016

(51) Int. Cl.
*G06F 16/30* (2019.01)
*G06F 16/9535* (2019.01)
(Continued)

(52) U.S. Cl.
CPC .... *G06F 16/9535* (2019.01); *G06F 16/24578* (2019.01); *G06F 16/285* (2019.01); *G06Q 30/0201* (2013.01); *G06Q 50/01* (2013.01)

(58) Field of Classification Search
CPC ............... G06Q 30/0201; G06Q 50/01; G06F 17/3053; G06F 17/30598; G06F 16/9535; G06F 16/285; G06F 16/24578
(Continued)

(56) References Cited

U.S. PATENT DOCUMENTS 7,565,338 B2    7/2009   Beniaminy et al.
7,865,457 B2    1/2011   Ravin et al.
(Continued)

FOREIGN PATENT DOCUMENTS

JP    2003-157368    5/2003
JP    2005-250841    9/2005
(Continued)

OTHER PUBLICATIONS

B2SP.NL. Business to Science Portal, 2011, 1 page. http://www.b2sp.nl/en/expertise.
(Continued)

*Primary Examiner* — Kuen S Lu

(57) ABSTRACT

Providing information technology support can include receiving an information technology question posed by a user, associating a tag with the question based on a topic of the question, determining a plurality of people having a skill associated with the question based on the tag, determining a subset of the plurality of people having the skill that also have a relationship with the user exceeding a relationship threshold, and providing the question to each of the subset of the plurality of people.

15 Claims, 5 Drawing Sheets

(51) Int. Cl.
*G06F 16/28* (2019.01)
*G06F 16/2457* (2019.01)
*G06Q 50/00* (2012.01)
*G06Q 30/02* (2012.01)

(58) Field of Classification Search
USPC .......................................................... 707/734
See application file for complete search history.

(56) References Cited

U.S. PATENT DOCUMENTS

| | | | |
|---|---|---|---|
| 8,266,098 B2 | 9/2012 | Hu et al. | |
| 8,380,655 B2 | 2/2013 | Nevin et al. | |
| 8,484,181 B2 | 7/2013 | Levin et al. | |
| 9,342,608 B2 * | 5/2016 | Cook | G06N 5/02 |
| 2008/0097994 A1 * | 4/2008 | Teramoto | G06K 9/00677 |
| 2010/0325216 A1 * | 12/2010 | Singh | G06Q 10/0637 |
| | | | 709/206 |
| 2012/0095977 A1 * | 4/2012 | Levin | G06F 16/9535 |
| | | | 707/706 |
| 2012/0095978 A1 | 4/2012 | Levin et al. | |
| 2013/0041906 A1 | 2/2013 | Adar et al. | |
| 2013/0173725 A1 * | 7/2013 | Ventilla | G06Q 10/10 |
| | | | 709/206 |
| 2013/0246327 A1 * | 9/2013 | Tabrizi | G06N 5/022 |
| | | | 706/50 |
| 2015/0254785 A1 * | 9/2015 | Yang | G06N 7/005 |
| | | | 705/26.41 |

FOREIGN PATENT DOCUMENTS

| | | | | |
|---|---|---|---|---|
| KR | 20030045765 | | 6/2003 | |
| KR | 20120071966 | | 7/2012 | |
| WO | WO 2001/027847 A1 * | 4/2001 | | G06F 17/60 |
| | | | | 707/734 |
| WO | WO-0127847 | | 4/2001 | |

OTHER PUBLICATIONS

Korean Intellectual Property Office, International Search Report and Written Opinion for PCT/US2013/067202 dated Oct. 29, 2013 (13 pages).

* cited by examiner

○ SERVICE ANYWHERE  ⌂ 👥 🗔  👤 ⌄ 🕐

— 222

| CAN'T CONNECT SMARTPHONE TO SOMELIE NETWORK 🔍 |

— 224

SEARCH RESULTS (14) ———————— SHOW ALL ITEMS >

HOW MY MOBILE WILL RECOGNIZE MY NETWORK FROM HOME?
[Q&A] MOBILE ACCESS TO SOMELIE NETWORK MAY BE SLOW OR NOT WORKING DUE TO HURRICANE
IN ORDER TO MAKE YOUR HOME NETWORK PROCEED AS USUAL, TRY TO REBOOT YOUR LAPTOP AND [...]

HOW CAN I MAKE CALLS FROM MY COMPUTER TO LANDLINE AND MOBILE PHONES IN INDIA?
[Q&A] YOU SHOULD CHOOSE SOMELIE NETWORK IN THE NEXT WINDOW AND CLICK CONNECT AND
2-3 MINUTES, PRESS "NEXT" ON THE WINDOW OPENED. THE INSTALLATION WILL FINNISH AND THEN [...]

REQUEST SUPPORT: RESET PASSWORD
[SERVICE OFFERING]
PHONES VPN AND LAPTOPS. CONTACT YOUR LOCAL IT ASSISTANCE TO PROVIDE FULL SERVICE[...]

HOW TO CONNECT TO THE NETWORK FROM YOUR SMARTPHONE AT HOME
[ARTICLE] STEP BY STEP INSTRUCTIONS ON HOW TO CONNECT SOMELIE NETWORK VIA SMARTPHONE
A DETAILED MANUAL. EASY AND FREE TO DOWNLOAD AND USE SO YOUR EASY START WILL BE ENSURE [...]

HOW MY MOBILE WILL RECOGNIZE MY NETWORK FROM HOME?

≡ NEWS

NETWORK PROBLEMS DUE TO HURRICANE
(2 HOURS AGO)

USER GUIDANCE FOR LYNC v. 10
(2 HOURS AGO)

ACROBAT PRO 8 INSTALLATION MIGHT
CAUSE NETWORK PROBLEMS
(2 HOURS AGO)

OCE SERVICE- NOT WORKING
(2 HOURS AGO)

MORE

🔍 RELATED SEARCHES

HOW TO ADD SMARTPHONE TO SOM...
CONNECT ANDROID PHONE TO SOM...

— 226

> COULDN'T FIND WHAT YOU'RE LOOKING FOR?   👥 ASK FRIENDS | ⊞ REQUEST SUPPORT | SEARCH 🔍

PROVIDING INFORMATION TECHNOLOGY SUPPORT

BACKGROUND

As technologies evolve, demand for information technology (IT) support may continue to grow. IT support can be provided by IT specialists (e.g., IT professionals) in an IT department of an enterprise, for instance. However, there are limits to the knowledge and/or skills of IT specialists. Users encountering an IT question may turn to the internet by way of one or more forums (e.g., IT forums).

BRIEF DESCRIPTION OF THE DRAWINGS

FIG. 2 is an example of a display associated with requesting IT support according to the present disclosure.

DETAILED DESCRIPTION

Figure 1:
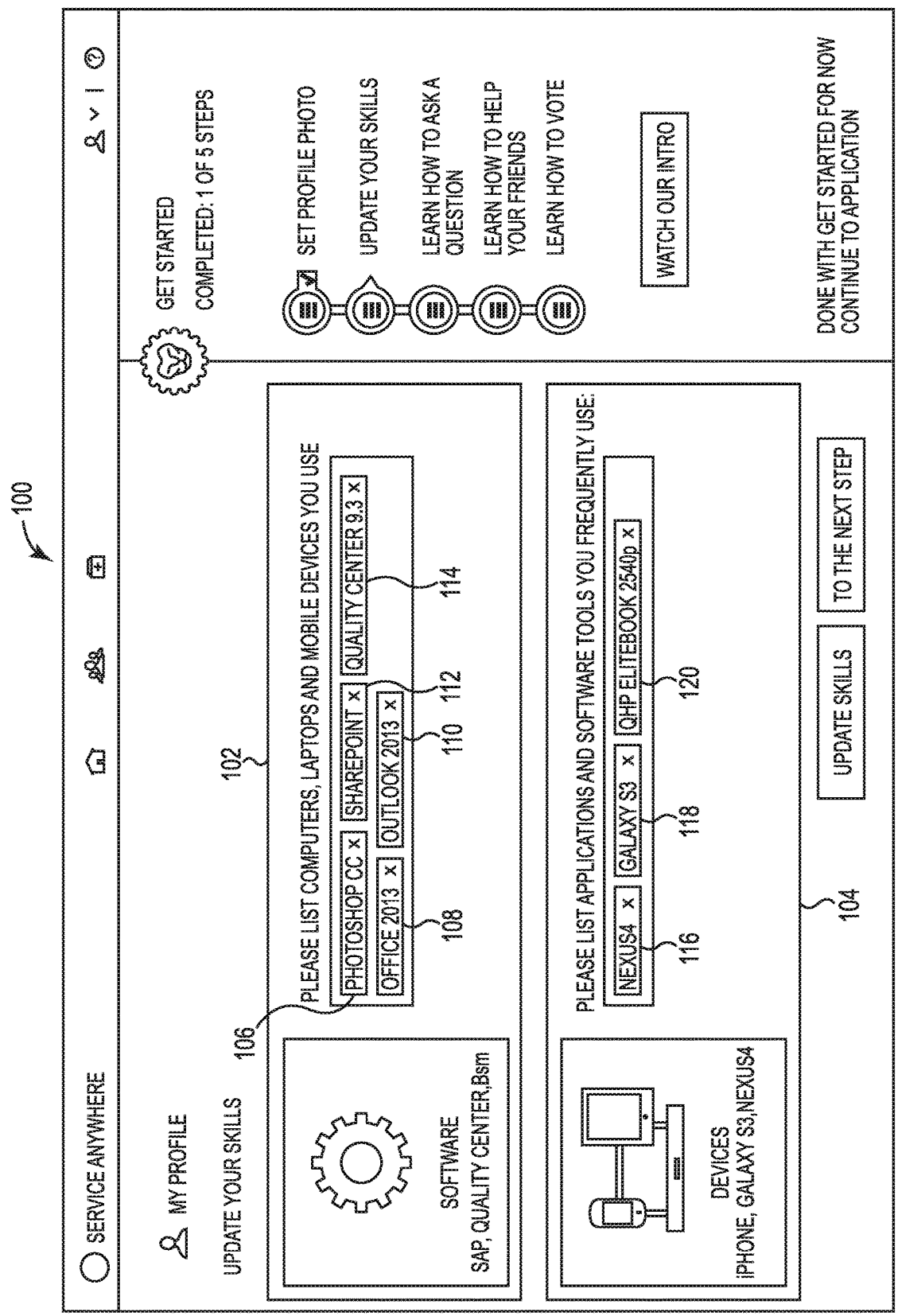
FIG. 1 is an example of a display associated with modifying a profile according to the present disclosure.

Technology areas that IT specialists may be asked to support can exceed what IT departments are capable of handing. Users encountering an IT question may turn to the internet by way of one or more IT forums. However, the internet may not be particularly helpful to the user when the question is platform-specific or enterprise-specific, for example. Additionally, users may expect an increasingly social, consumer-oriented type of experience when seeking IT support (e.g., help). Thus, users may be more inclined to value answers from people with whom the user has an existing relationship than from a responder on a forum, who may be a stranger to the user. Examples of the present disclosure can leverage knowledge and/or skills across an enterprise, as well as relationships between users in an enterprise, to provide users requesting IT support with the person or persons most likely to have the ability and willingness to provide it.

Typically, when a user encounters an IT issue, the user may search for an existing solution. For example, the user can navigate through IT categories and/or conduct a number of searches (e.g., using key words) through IT materials (e.g., articles, forums, etc.). Where such "self-help" efforts fall short, users can utilize various examples disclosed herein to ask a question (e.g., make a request for IT support). As discussed further below, the question can be tagged (e.g., automatically tagged) based on one or more topics of the question.

Examples herein can use the tag(s) to search profiles of other users to determine which of those users may possess the skills and/or knowledge needed to answer the question. Relationships (e.g., social, enterprise, geographical, and/or organizational relationships) between the users possessing the skills and/or knowledge and the user that asked the question can be used to rank the users possessing the skills and/or knowledge.

By so doing, examples herein avoid presenting the question to an entire enterprise as such presentation may be perceived as spam and/or otherwise ignored by users of the enterprise. Instead, the question can be presented to a portion (e.g., subset) of the users of an enterprise deemed most likely to have the skills and/or knowledge needed to answer the question. Such a subset can further be limited to include those users having a particular relationship with the user that asked the question. For example, users having a relationship with the user that asked the question may be more likely to answer the question than users not having a relationship with the user that asked the question. Accordingly, such users may provide an answer more quickly and/or more effectively than users that do not have a relationship with the user that asked the question.

As previously discussed, profiles of users can be searched using question tags. Each user can be associated with a respective profile. A profile can be modified (e.g., edited, created, added to, subtracted from, etc.) in various manners. As discussed further below, a profile can be modified (e.g., manually) by a user. An IT specialist can modify a profile associated with a user according to an organizational structure (e.g., provided the IT specialist has the permission and/or authority to modify user profiles). A user can modify his or her own profile. A user's profile can be modified via inputs (e.g., textual inputs and/or inputs made using other peripheral devices) made by the user. Such inputs can be made into and/or collected from various programs and/or applications.

As used herein, "a" or "a number of" something can refer to one or more such things.

FIG. 1 is an example of a display 100 associated with modifying a profile according to the present disclosure. The display 100 can be presented to a user upon initial login, for instance, though examples of the present disclosure are not so limited. In various examples, users can modify their profile whenever they desire (e.g., upon navigating to display 100), for instance.

The display 100 can allow a user to input skills the user possesses. Examples herein can prompt a user to input such skills, for instance. Such a prompt may ask the user to input various information technologies, software tools, device types, operating systems, development technologies, etc. the user uses regularly (e.g., daily), is proficient in, has skills in, is knowledgeable about, etc.

Such skills can be entered textually and/or selected from one or more menus (e.g., a drop-down menu). As referred to generally herein, skills possessed by a user can refer to topics about which the user is knowledgeable (and vice versa). For example, a user may possess skills regarding a particular computer program and may thus be knowledgeable about the topic of that computer program.

Topics and/or skills may be arranged by category. For example, the display 100 includes a category 102 (e.g., "software") and a category 104 (e.g., "devices"). In the display 100 illustrated in FIG. 1, the user has indicated that she possesses a number of skills in a number of topics under the software category 102. Such skills include skills associated with a topic 106 (e.g., Photoshop CC), a topic 108 (e.g., Office 2013), a topic 110 (e.g., Outlook 2013), a topic 112 (e.g., SharePoint), and a topic 114 (e.g., Quality Center 9.3). For example, by indicating possession of skills associated with these topics, the user has claimed to be knowledgeable about them.

Similarly, the user has indicated possession of a number of skills in a number of topics under the devices category 104. Those skills include skills associated with a topic 116 (e.g., Nexus 4), a topic 118 (e.g., Galaxy S3), and a topic 120 (e.g., HP EliteBook 2540p). It is to be understood that the names and amounts of topics illustrated in FIG. 1 are merely examples for illustrative purposes; that is, examples herein are not limited to the categories or topics illustrated in FIG. 1.

Once input, the topics about which the user is knowledgeable (e.g., has skills in) can be matched (e.g., automatically matched) with existing tags and/or new tags. The tags can be indexed in a database and/or saved as a part of the user's profile. The tags can be searchable as discussed further below, for instance.

A profile of a user can be modified through other means. Examples herein can collect user inputs made into a computing device (e.g., textual inputs). Such inputs can be made using various applications and/or programs (e.g., chat programs, spreadsheets, feeds, transactional data, email, etc.). In various examples, an enterprise system built on a cloud platform can allow the collection of inputs across a variety of devices and/or applications (e.g., using a connector framework). Such inputs can be used to modify (e.g., enrich) a user's profile. For example, if a user responds to a question posed by another user (e.g., answers the question and/or comments on the question) examples herein can determine that the response indicates a degree of skin and/or knowledge associated with one or more topics of the question. The text of the response can be indexed as a part of the user's profile, for instance.

Additionally, resolutions to IT incidents can be indexed as a part of the user's profile, as well as service requests made by the user. In various examples, comments and/or defect resolutions provided by an IT professional, developer and/or tester (e.g., quality assurance tester) can be used to modify a user's profile.

Beyond collecting user inputs to determine skills the user possesses, examples herein can use the inputs to determine skills the user does not possess. In other words, information technology topics about which the user is not knowledgeable can be determined based on the collected inputs. Topics about which the user is not knowledgeable can be used to modify the user's profile. For example, if a user asks a question regarding a particular topic, examples herein can determine (e.g., assume) that the user is not knowledgeable about the topic. Likewise, the user not answering a colleague's question regarding a particular topic can be interpreted by examples herein as a lack of user knowledge regarding the topic. Indeed, the user may be provided with an option to refuse to answer a question (e.g., the user can be provided a link associated with a question indicating that the user does not know an answer to the question or is unable to provide the IT support requested). Skills the user does not possess (e.g., topics about which the user is not knowledgeable) can be used to modify the profile associated with the user.

As previously discussed, when a user encounters an IT question, the user can make a request for IT support regarding the question. That is, the user can utilize various examples herein to ask the question. As referred to generally herein, the user that asks, asked, and/or is asking a question may be referred to as the "asker."

FIG. 2 is an example of a display 222 associated with requesting IT support according to the present disclosure. As shown in FIG. 2, display 222 includes a question window 224. Question window 224 can be used to enter the IT question and/or issue the user has encountered, for instance, though examples herein do not limit text entered into question window 224 to be in the form of a question. For example, as illustrated in FIG. 2, the IT question entered by the example user is "Can't connect smartphone to Somelie network." Examples herein can receive the question posed by the user.

A search results window 226 can be presented responsive to receiving the request for IT support (e g., the question). The search results window 226 can include articles, service offerings, similar questions and/or answers received from other users, etc. The search results window 226 can include any information received following a text search using the question entered into question window 224, for instance. However, as previously discussed, askers may not find an answer they seek using such "self-help" methods. Accordingly, examples herein can include a link 230 which can be activated by the asker to pose the question to members of the users enterprise. Enterprise, as referred to herein, can include a company, a team, a workgroup, a division, a branch, etc. Enterprises can be determined geographically and/or by organizational structure, among others.

Upon activation of the link 230, examples herein can tag (e.g., automatically tag) the question entered into question window 224. That is, examples herein can associate one or more tags with the question based on one or more topics of the question. Examples can utilize a pool of textual tags covering a variety of information technology topics. Topics can be any topic(s) about which a user may encounter an IT question. A topic can include various makes, models, versions, and/or types of software, devices, operating systems, development technologies, etc. Topics can be determined based on a title of the question, text in the question, and/or device(s) used by the asker, among others.

A question can be tagged using multiple tags depending on the topic(s) arising out of the question. A question can be tagged based on a title of the question, one or more terms used within the question, a device used to ask the question, and/or a location where the question was asked, among other bases.

Once determined, the tag(s) can be displayed to the asker. The asker can modify the tags in various manners. For example, the asker can remove one or more tags, edit one or more tags, and/or add one or more tags. The title of the question, other text, description, and the tag(s) can be indexed and saved in one or more searchable databases.

The question text (e.g., title, description, etc.) and associated tag(s) can be used to query a database of other user profiles (previously discussed) to determine a plurality of users (e.g., people) having a skill associated with the question (e.g., a skill and/or combination of skills that exceeds a skill threshold). In various examples, tags of user profiles can be given higher weight than collected inputs because, for example, the tags may identify specific skills associated with the user(s). Users determined to have skills and/or knowledge about one or more topics of the question can be ranked according to textual proximity to the question text and/or tags such that those users can effectively be sorted based on their respective abilities (e.g., likelihoods) of answering the question.

Examples herein can determine a plurality of users having skills (and/or not having a lack of skills (discussed below)) exceeding a particular threshold. That is, examples can determine one or more users having a determined ability and/or likelihood of providing the information technology support exceeding the particular threshold.

Examples can also determine a relationship between the first user (e.g., a potential responder to the question) and the second user (e.g., the asker). Relationships can include relationships based upon users' positions in an enterprise, as discussed above, and/or social relationships. For example, relationships can include relationships within a company, a team, a workgroup, a division, a branch, etc. Relationships can vary geographically and/or by organizational structure, among others. Users having a relationship with the asker exceeding a relationship threshold may be ranked higher than those who do not.

Accordingly, the question can be provided (e.g., communicated) to each of a subset of the plurality of people having the skill(s) that also have a relationship with the asker exceeding a relationship threshold. The question can be presented in venous manners. In one example, the question can be provided via an email sent to each of the plurality of users.

Figure 3:
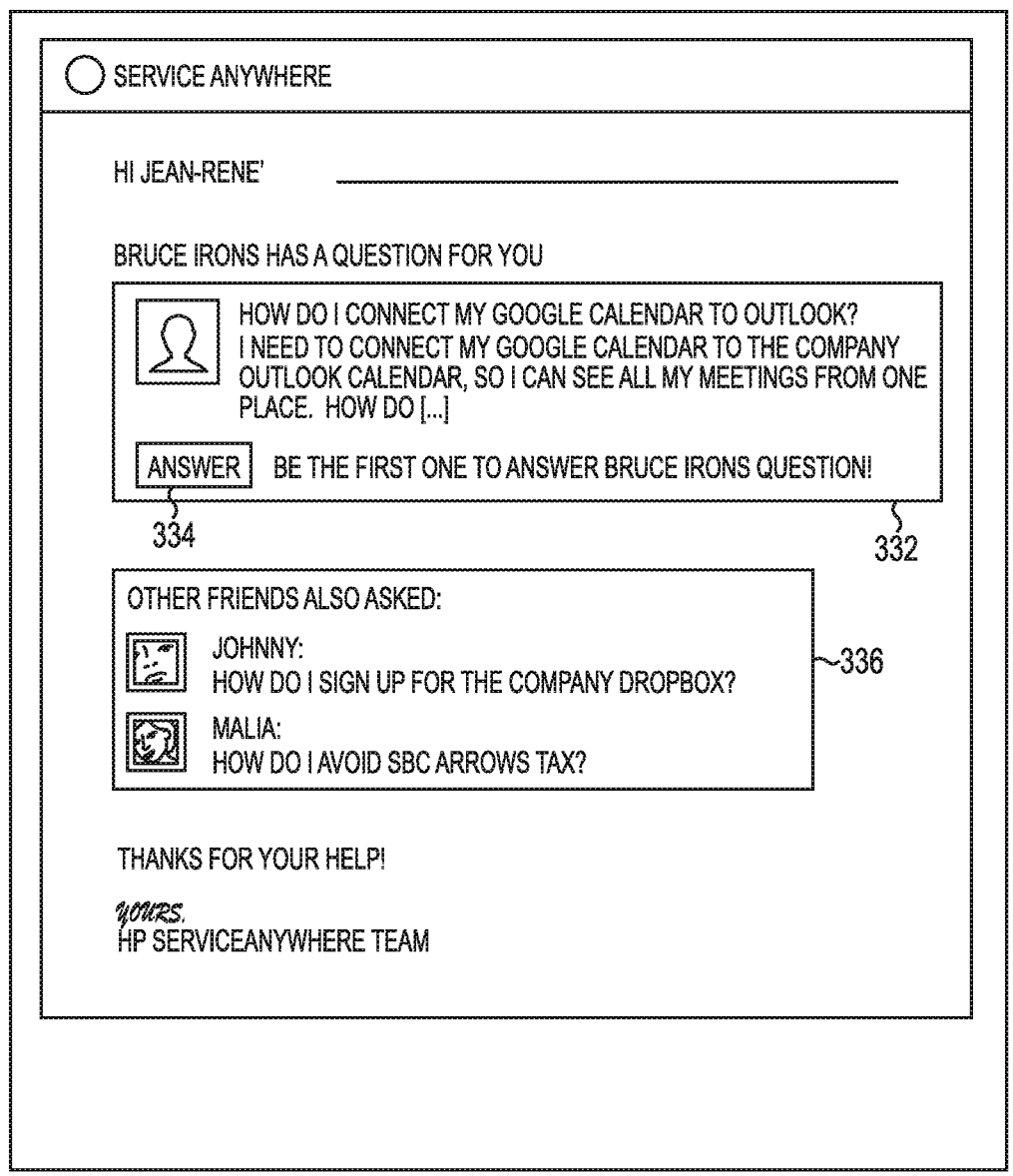
FIG. 3 is an example of an email associated with requesting IT support according to the present disclosure.

FIG. 3 is an example of an email 330 associated with requesting IT support according to the present disclosure. As shown in FIG. 3, the email 330 can include a question 332. The email 330 can be configured to appear as though it was sent directly from the asker of the question 332 to enhance a personal appearance of the question 332, for instance. The email 330 can include a picture of the asker. A link 334 can be provided in the email 330 allowing the recipient of the email 330 to respond to (e.g., answer) the question 332. The email 330 can include a window 336 configured to display questions determined to be similar to the question 332. The window 336 can include questions still awaiting answers, for instance.

If a question remains unanswered for a particular period of time (e.g., 2 days), another search can be performed to determine users likely to provide an answer. In some examples, users can "follow" a question e.g., if they have the same or a similar question of their own). Then, the question can be provided to a plurality of colleagues of each of the number of followers (e.g., people having a relationship with one or more of the followers). The question can be provided to the plurality of colleagues responsive to the time period following the initial provision of the question exceeding a time threshold. The question can be provided to the colleague(s) of the follower(s) in an email, such as email 330 previously discussed for instance. The email can be configured to appear as though it was sent directly from the follower(s).

Once a question is answered, examples herein can allow various users, including the esker and/or followers of the question, to rate the answer of the question and/or the IT support provided by the question answerer. A follower of a question can receive a notification (e.g., an email) responsive to the question being answered. The notification can include the answer to the question and can include a field configured to allow the follower to rate the answer, for example. Users that answer a particular number of questions with a particular level of ratings can earn increased moderation capabilities, for instance, to enhance various user experiences. Answered questions (e.g., answered questions having a particular rating) can be stored in a database in association with related articles and/or information such that the answers can be searched by future users encountering similar questions.

Examples of the present disclosure can enable IT specialists and/or other users in an enterprise to proactively find questions that best match their skills and/or knowledge in order to provide answers. For example, text can be extracted from a user's profile and used to search a database of unanswered questions. Questions matching the user's skill and/or knowledge beyond a particular threshold can be provided to the user.

Figure 4A:
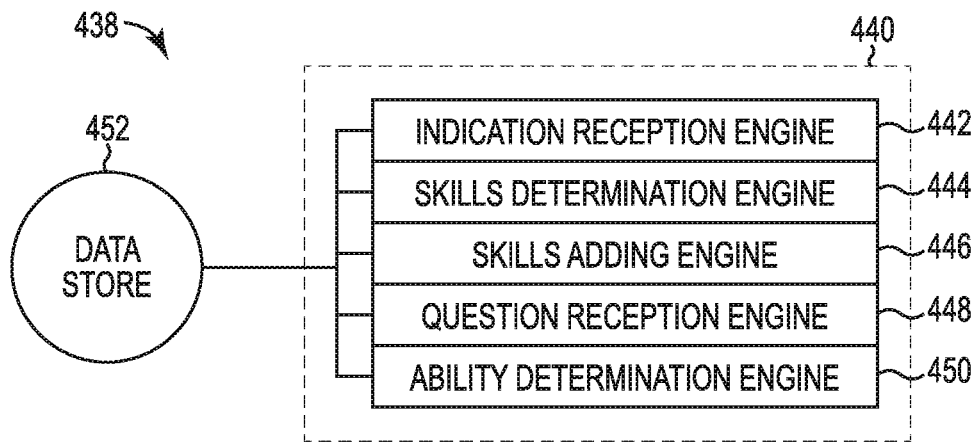
FIG. 4A illustrates a diagram of an example of a system for providing IT support according to the present disclosure.

FIGS. 4A-43 illustrate examples of systems 438, 454 according to the present disclosure. FIG. 4A illustrates a diagram of an example of a system 438 for providing IT support according to the present disclosure. The system 438 can include a data store 452, a management system 440, and/or a number of engines 442, 444, 446, 448, 450. The management system 440 can be in communication with the data store 452 via a communication link, and can include the number of engines (e.g., indication reception engine 442, skills determination engine 444, skills adding engine 446, question reception engine 448, ability determination engine 450, etc.). The management system 440 can include additional or fewer engines than illustrated to perform the various functions described herein.

The number of engines can include a combination of hardware and programming that is configured to perform a number of functions described herein (e.g., receive an indication, made by a first user, of a plurality of information technology skills possessed by the first user). The programming can include program instructions (e.g., software, firmware, etc.) stored in a memory resource (e.g., computer readable medium, machine readable medium, etc.) as well as hard-wired program (e.g., logic).

The indication reception engine 442 can include hardware and/or a combination of hardware and programming to receive an indication, made by a first user, of a plurality of information technology skills possessed by the first user. Examples herein can prompt a user to input such skills, for instance. Such a prompt may ask the user to input various information technologies, software tools, device types, operating systems, development technologies, etc, the user uses regularly (e.g., daily), is proficient in, has skills in, is knowledgeable about, etc.

The skills determination engine 444 can include hardware and/or a combination of hardware and programming to determine additional information technology skills possessed by first user based on a plurality of inputs made by the first user. The skills determination engine 444 can include hardware and/or a combination of hardware and programming to determine information technology skills the first user does not possess based on the plurality of inputs made by the first user. The inputs (e.g., textual inputs) made by the first user can be collected from inputs made using various applications and/or programs (e.g., chat programs, spreadsheets, feeds, transactional data, email, etc.).

The skills adding engine 446 can include hardware and/or a combination of hardware and programming to add an indication associated with the information technology skills and an indication associated with the additional information technology skills to a profile associated with the first user. The skills adding engine 446 can include hardware and/or a combination of hardware and programming to add an indication associated with the information technology skills the first user does not possess to the profile associated with the first user. Skills the user does—and/or does not—possess can be used to modify the profile associated with the user. The text of user inputs can be indexed as a part of the user's profile, for instance.

The question reception engine 448 can include hardware and/or a combination of hardware and programming to receive a question posed by a second user (e.g., the asker). The question can be posed by the second user via display 222 (previously discussed) for instance, though examples herein are not so limited.

The ability determination engine 450 can include hardware and/or a combination of hardware and programming to determine an ability of the first user to answer the question based on the profile associated with the first user. Determining the ability of the first user to answer the question can include using the question text (e.g., title, description, etc.) and associated tag(s) to query a database of other user profiles (including the profile of the first user) to determine a plurality of people (e.g., users) having a skill associated with the question. People determined to have skills and/or knowledge about one or more topics of the question can be ranked according to textual proximity to the question text and/or tags such that those people can effectively be sorted based on their respective abilities (e.g., likelihoods) of answering the question.

As previously discussed, the management system 440 can include additional or fewer engines than illustrated to perform the various functions described herein. For example, though not shown in the example illustrated in FIG. 4A, the management system 450 can include a communication engine. The communication engine can include hardware and/or a combination of hardware and programming to communicate the question to the first user responsive to the ability of the first user to answer the question exceeding an ability threshold, and a relationship between the first user and the second user exceeding a relationship threshold. The communication engine can include hardware and/or a combination of hardware and programming to communicate the question to the first user via an email sent to the first user, wherein the email includes a link associated with providing an answer to the question.

Figure 4B:
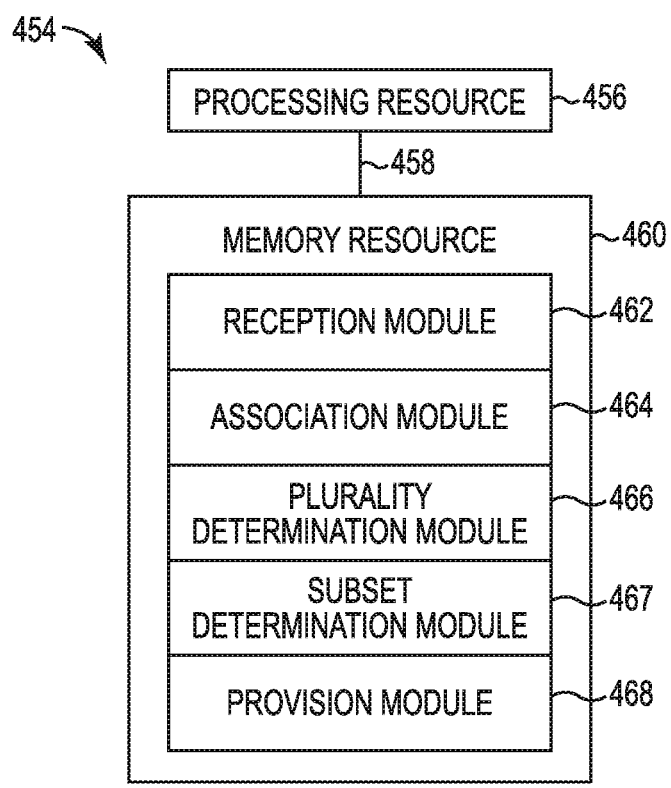
FIG. 4B illustrates a diagram of an example of a computing device according to the present disclosure.

FIG. 4B illustrates a diagram of an example of a computing device 454 according to the present disclosure. The computing device 454 can utilize software, hardware, firmware, and/or logic to perform a number of functions herein.

The computing device 454 can be any combination of hardware and program instructions configured to share information. The hardware for example can include a processing resource 456 and/or a memory resource 460 (e.g., computer-readable medium (CRM), machine readable medium (MRM), database, etc.) A processing resource 456, as used herein, can include any number of processors capable of executing instructions stored by a memory resource 460. The processing resource 456 may be integrated in a single device or distributed across multiple devices. The program instructions (e.g., computer-readable instructions (CRI)) can include instructions stored on the memory resource 460 and executable by the processing resource 456 to implement a desired function (e.g., to define a number of rules based on a number of parameter values).

The memory resource 460 can be in communication with a processing resource 456. A memory resource 460, as used herein, can include any number of memory components capable of storing instructions that can be executed by processing resource 456. Such memory resource 460 can be a non-transitory CRM or MRM. Memory resource 460 may be integrated in a single device or distributed across multiple devices. Further, memory resource 460 may be fully or partially integrated in the same device as processing resource 456 or it may be separate but accessible to that device and processing resource 456. Thus, it is noted that the computing device 454 may be implemented on a participant device, on a server device, on a collection of server devices, and/or a combination of the user device and the server device.

The memory resource 460 can be in communication with the processing resource 456 via a communication link (e.g., a path) 458. The communication link 458 can be local or remote to a machine (e.g., a computing device) associated with the processing resource 456. Examples of a local communication link 458 can include an electronic bus internal to a machine (e.g., a computing device) where the memory resource 460 is one of volatile, non-volatile, fixed, and/or removable storage medium in communication with the processing resource 456 via the electronic bus.

A number of modules 462, 464, 466, 467, 468 can include CRI that when executed by the processing resource 456 can perform a number of functions. The number of modules 462, 464, 466, 467, 468 can be sub-modules of other modules. For example, the reception module 462 and the association module 464 can be sub-modules and/or contained within the same computing device. In another example, the number of modules 462, 464, 466, 467, 468 can comprise individual modules at separate and distinct locations (e.g., CRM, etc.).

Each of the number of modules 462, 464, 466, 467, 468 can include instructions that when executed by the processing resource 456 can function as a corresponding engine as described herein. For example, the reception module 462 can include instructions that, when executed by the processing resource 456 can function as the question reception engine 448. In another example, provision module 468 can include instructions that when executed by the processing resource 456 can function as the communication engine (previously discussed).

The reception module 462 can include instructions that when executed by the processing resource 456 receive an IT question posed by a user. The question can be posed by a user via display (e.g., display 222 previously discussed with respect to FIG. 2) for instance, though examples herein are not so limited.

The association module 464 can include instructions that when executed by the processing resource 456 associate a tag with the question based on a topic of the question. The association module 464 can include instructions that when executed by the processing resource 456 associate an additional tag with the question based on a type of device associated with the user (e.g., asker). The association module 464 can include instructions that when executed by the processing resource 456 allow a user (e.g., the asker) to modify the tag and/or any additional tags associated with the question, and associate additional tags with the question.

The plurality determination module 466 can include instructions that when executed by the processing resource 456 determine a plurality of people having a likelihood of having a skill associated with the question exceeding a particular threshold based on the tag. The plurality determination module 466 can include instructions that when executed by the processing resource 456 determine the plurality of people having the skill associated with the question based on a respective profile associated with each of the plurality of people. The plurality determination module 466 can include instructions that when executed by the processing resource 456 determine a respective likelihood associated with each of the plurality of people of providing an answer to the question based on the tag associated with the question and a respective profile associated with each of the plurality of people, and rank the plurality of people based on the respective likelihood associated with each of the plurality of people.

The subset determination module 467 can include instructions that when executed by the processing resource 456 determine a subset of the plurality of people having the skill that also have a relationship with the user exceeding a relationship threshold. As previously discussed, users having a relationship with the asker may be more likely to answer the question than users not having a relationship with the asker.

The provision module 468 can include instructions that when executed by the processing resource 456 provide the question to each of the subset of the plurality of people. The provision module 468 can include instructions that when executed by the processing resource 456 provide the question to each of the subset of the plurality of people via an email sent to each of the subset of the plurality of people. The provision module 468 can include instructions that when executed by the processing resource 456 determine the plurality of people having a skill associated with the question that exceeds a skill threshold based on the tag.

Examples herein are not limited to the number and/or type(s) of modules illustrated in FIG. 4B. For example, a module according to the present disclosure can include instructions that when executed by the processing resource 456 modify each respective profile associated with each of a plurality of people based on a plurality of inputs made by each of the plurality of people over a period of time (e.g., a period of time occurring before the IT question is received).

Figure 5:
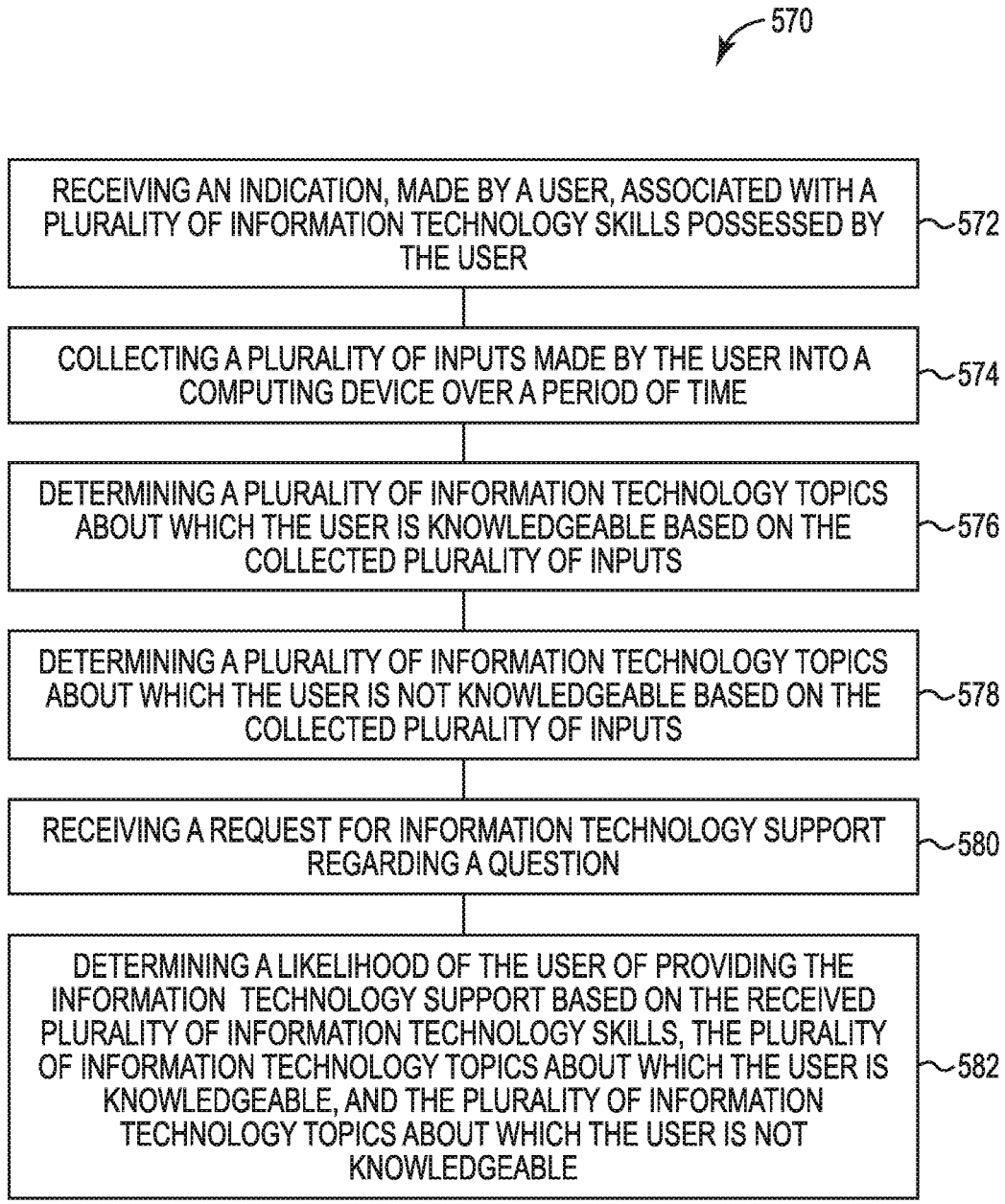
FIG. 5 illustrates a flow chart of an example of a method for providing IT support according to the present disclosure.

FIG. 5 illustrates a flow chart of an example of a method 570 for providing IT support according to the present disclosure. At 572, the method 570 can include receiving an indication, made by a user, of associated with a plurality of information technology skills possessed by the user. Examples herein can prompt a user to input such skills, for instance. Such a prompt may ask the user to input various information technologies, software tools, device types, operating systems, development technologies, etc. the user uses regularly (e.g., daily), is proficient in, has skills in, is knowledgeable about, etc.

At 574, the method 570 can include collecting a plurality of inputs made by the user into a computing device over a period of time. The collected inputs can be textual inputs, for instance, and can be made using various applications and/or programs (e.g., chat programs, spreadsheets, feeds, transactional data, email, etc.).

At 576, the method 570 can include determining a plurality of information technology topics about which the user is knowledgeable based on the collected plurality of inputs. For example, if a user responds to a question posed by an asker (e.g., answers the question and/or comments on the question) examples herein can determine that the response indicates a degree of skill and/or knowledge associated with one or more topics of the question.

At 578, the method 570 can include determining a plurality of information technology topics about which the user is not knowledgeable (e.g., determining skills the user does not possess) based on the collected plurality of inputs. As previously discussed, the user not answering a colleague's question regarding a particular topic can be interpreted by examples herein as a lack of user knowledge regarding the topic, as can the user actively refusing to answer a question (e.g., by indicating they do not know an answer to the question), among others At 580, the method 570 can include receiving a request for information technology support regarding a question. The request for IT support can be made by an asker using display 222 (previously discussed) for instance, though examples herein are not so limited.

At 582, the method 570 can include determining a likelihood of the user of providing the information technology support based on the received plurality of information technology skills, the plurality of information technology topics about which the user is knowledgeable, and the plurality of information technology topics about which the user is not knowledgeable. As previously discussed, a likelihood of the user of providing the information technology support can be determined based on a profile of the user. The profile can include the received plurality of information technology skills, the plurality of information technology topics about which the user is knowledgeable, and the plurality of information technology topics about which the user is not knowledgeable, for instance.

Though not shown in FIG. 5, method 570 can include providing the question to the user responsive to the determined likelihood of the user of providing the information technology support exceeding a particular threshold, providing the question to a plurality of additional users responsive to each user of the plurality of additional users having a determined likelihood of providing the information technology support exceeding the particular threshold, determining a plurality of followers of the question, and providing the question to a plurality of colleagues of each of the number of followers responsive to a time period following the provision of the question to the user and the plurality of additional users exceeding a time threshold.

Though not shown in FIG. 5, method 570 can include providing the question to the user responsive to the determined likelihood of the user of providing the information technology support exceeding a particular threshold, receiving the information technology support regarding the question from the user, and receiving a rating associated with the information technology support regarding the question from a follower of the question.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N" and "P", particularly with respect to reference numerals in the drawings, indicate that a number of the particular feature so designated can be included with a number of examples of the present disclosure.

What is claimed:

1. A non-transitory computer-readable medium storing instructions executable by a processing resource to:
   receive an information technology (IT) request posed by a user regarding an IT issue;
   associate a tag with the IT request based on a topic of the IT request;
   determine a plurality of people having a skill associated with the IT request exceeding a particular skill threshold, wherein the determining of the plurality of people having the skill associated with the IT request exceeding the particular skill threshold is based on querying a database of profiles associated with the plurality of people having the skill associated with the IT request, the database of profiles queried using the tag and text in the IT request;
   determine a subset of the plurality of people having the skill associated with the IT request that also have a relationship with the user exceeding a relationship threshold;
   provide the IT request to each of the subset of the plurality of people having the skill associated with the IT request to seek targeted IT support for the IT issue;

receive, responsive to the IT request provided to each of the subset of the plurality of people having the skill associated with the IT request, an answer for the IT issue; and modify the profiles associated with the plurality of people having the skill associated with the IT request based on resolutions of corresponding IT issues by the plurality of people having the skill associated with the IT request.

2. The non-transitory computer-readable medium of claim 1, wherein the determining of the plurality of people having the skill associated with the IT request exceeding the particular skill threshold is further based on:

a respective indication made by each of the plurality of people associated with a respective IT skill associated with the IT request possessed by each of the plurality of people;

a respective first IT topic about which each of the plurality of people is knowledgeable, determined based on a respective computing device inputs made by each of the plurality of people over a respective period of time; and a respective second IT topic about which each of the plurality of people is not knowledgeable, determined based on the respective computing device inputs made by each of the plurality of people over the respective period of time.

3. The non-transitory computer-readable medium of claim 2, wherein the instructions include instructions to allow the user to:

modify the tag associated with the IT request; and
associate an additional tag with the IT request.

4. The non-transitory computer-readable medium of claim 1, wherein the instructions include instructions to associate an additional tag with the IT request based on a type of device associated with the user.

5. The non-transitory computer-readable medium of claim 1, wherein the instructions include instructions to provide the IT request to each of the subset of the plurality of people via an email sent to each of the subset of the plurality of people.

6. The non-transitory computer-readable medium of claim 1, wherein the instructions include instructions to modify a respective profile of the profiles associated with the plurality of people further based on a respective plurality of computing device inputs made by a respective person of the plurality of people over a respective period of time.

7. A system, comprising:
a processor; and
a non-transitory storage medium storing instructions executable on the processor to:
receive an indication, made by a first user, of a plurality of information technology (IT) skills possessed by the first user;
determine additional IT skills possessed by the first user based on a plurality of inputs made by the first user using a plurality of applications;
add an indication associated with the plurality of IT skills and an indication associated with the additional IT skills to a profile associated with the first user;
receive an IT request regarding an IT issue posed by a second user;
determine an ability of the first user to answer the IT request based on the profile associated with the first user;

based on determining the ability of the first user to answer the IT request and responsive to determining by the instructions that a relationship between the first user and the second user exceeds a relationship threshold, send the IT request to the first user to seek targeted IT support for the IT issue;

receive, responsive to the IT request, an answer for the IT issue; and modify the profile associated with the first user based on a resolution of the IT issue.

8. The system of claim 7, wherein the instructions are executable on the processor to send the IT request to the first user via an email sent to the first user, and wherein the email includes a link associated with providing the answer to the IT request.

9. The system of claim 7, wherein the instructions are executable on the processor to:

determine IT skills the first user does not possess based on the plurality of inputs made by the first user; and add an indication associated with the IT skills the first user does not possess to the profile associated with the first user.

10. The system of claim 9, wherein the instructions are executable on the processor to:

cause resolution of the IT issue using information in the answer for the IT issue.

11. A computer-implemented method executed by a system comprising a hardware processor, comprising:

receiving an information technology (IT) request posed by a user regarding an IT issue;

associating a tag with the IT request based on a topic of the IT request;

determining a plurality of people having a skill associated with the IT request exceeding a particular skill threshold, wherein the determining of the plurality of people having the skill associated with the IT request exceeding the particular skill threshold is based on querying a database of profiles associated with the plurality of people having the skill associated with the IT request exceeding a particular skill threshold, the database of profiles queried using the tag and text in the IT request;

identifying people, from among the plurality of people having the skill associated with the IT request exceeding a particular skill threshold, who have a relationship with the user exceeding a relationship threshold, the identified people forming a subset of the plurality of people having the skill associated with the IT request that also have the relationship with the user exceeding the relationship threshold;

sending the IT request to each of the subset of the plurality of people having the skill associated with the IT request to seek targeted IT support for the IT issue;

receiving, responsive to the IT request provided to each of the subset of the plurality of people having the skill associated with the IT request, an answer for the IT issue; and modifying the profiles associated with the plurality of people having the skill associated with the IT request based on resolutions of corresponding IT issues by the plurality of people having the skill associated with the IT request, the corresponding IT issues including the IT issue.

12. The computer-implemented method of claim 11, further comprising:

receiving an indication, made by a given user, associated with a plurality of IT skills possessed by the given user;

collecting a plurality of inputs made by the given user into a computing device over a period of time;

determining a first plurality of IT topics about which the given user is knowledgeable based on the collected plurality of inputs;

determining a second plurality of IT topics about which the given user is not knowledgeable based on the collected plurality of inputs; and determining a likelihood of the given user providing IT support for the IT request based on the received indication associated with the plurality of IT skills, the first plurality of IT topics about which the given user is knowledgeable, and the second plurality of IT topics about which the given user is not knowledgeable, wherein determining the plurality of people having the skill associated with the IT request exceeding the particular skill threshold is based on the determined likelihood.

13. The computer-implemented method of claim 11, further comprising:

receiving a rating associated with the targeted IT support for the IT issue from a follower of the IT request.

14. The non-transitory computer-readable medium of claim 1, wherein the instructions are executable by the processing resource to:

cause resolution of the IT issue using information in the answer for the IT issue.

15. The computer-implemented method of claim 11, further comprising:

causing, by the system, resolution of the IT issue using information in the answer for the IT issue.

\* \* \* \* \*